(12) United States Patent
Miyazaki

(10) Patent No.: US 8,826,951 B2
(45) Date of Patent: Sep. 9, 2014

(54) PNEUMATIC TIRE

(75) Inventor: Tetsuji Miyazaki, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 589 days.

(21) Appl. No.: 13/178,212

(22) Filed: Jul. 7, 2011

(65) Prior Publication Data

US 2012/0006457 A1 Jan. 12, 2012

(30) Foreign Application Priority Data

Jul. 7, 2010 (JP) ................. 2010-154715

(51) Int. Cl.
- *B60C 11/13* (2006.01)
- *B60C 11/12* (2006.01)
- *B60C 11/11* (2006.01)
- *B60C 11/03* (2006.01)

(52) U.S. Cl.
CPC ......... *B60C 11/0306* (2013.04); *B60C 11/1218* (2013.04); *B60C 2011/1338* (2013.04); *B60C 2011/0388* (2013.04); *Y10S 152/902* (2013.01)
USPC .................... 152/209.21; 152/209.3; 152/902

(58) Field of Classification Search
CPC B60C 11/0306; B60C 11/0309; B60C 11/12; B60C 11/13; B60C 11/1204; B60C 11/1218; B60C 2011/1307; B60C 2011/1338; B60C 2011/1204; B60C 2011/1209; B60C 2011/1213; B60C 11/24; B60C 2011/0388; B60C 2011/1388; B60C 11/03; B60C 11/11; B60C 11/1222; B60C 11/1259; B60C 11/1263; B60C 11/1272; B60C 11/1281; B60C 11/1307

USPC .................. 152/209.21, 209.18, 209.19, 902, 152/154.2, DIG. 1, DIG. 3, 209.3
See application file for complete search history.

(56) References Cited

U.S. PATENT DOCUMENTS

| | | | | |
|---|---|---|---|---|
| 6,116,310 | A * | 9/2000 | Shinohara ................ | 152/209.21 |
| 6,601,280 | B1 * | 8/2003 | Kleckner .................... | 29/401.1 |
| 7,467,652 | B2 * | 12/2008 | Knispel et al. ............ | 152/209.21 |
| 2009/0078350 | A1 * | 3/2009 | Ohashi ..................... | 152/209.18 |
| 2010/0084062 | A1 * | 4/2010 | Miyazaki et al. ......... | 152/209.18 |
| 2010/0154953 | A1 * | 6/2010 | Kaji et al. ................ | 152/209.21 |
| 2010/0218867 | A1 * | 9/2010 | Matsumoto .............. | 152/209.18 |
| 2011/0005654 | A1 * | 1/2011 | Asayama et al. ........ | 152/209.21 |
| 2011/0290393 | A1 * | 12/2011 | Berger et al. ............ | 152/209.21 |

FOREIGN PATENT DOCUMENTS

| | | | |
|---|---|---|---|
| JP | 07-276923 | A | 10/1995 |
| JP | 10-086612 | A | 4/1998 |
| JP | 2005-067274 | A | 3/2005 |
| JP | 2007-276662 | A | 10/2007 |
| JP | 2009-126293 | A | 6/2009 |

* cited by examiner

*Primary Examiner* — Eric Hug
(74) *Attorney, Agent, or Firm* — Westerman, Hattori, Daniels & Adrian, LLP

(57) ABSTRACT

In a tread part, a land part (block) partitioned by a main transverse groove is provided with a thin groove having a narrower groove width than the main transverse groove and extending in a tire width direction. On a groove lateral face which is one of opposing groove lateral faces of the thin groove, ridges projecting toward the other groove lateral face and extending in a depth direction of the thin groove are provided. A plural number of the ridges are provided in parallel to each other at intervals in a length direction of the thin groove, and an extending length in the depth direction is set up to include at least two kinds.

14 Claims, 8 Drawing Sheets

AT THE TIME OF NEW ARTICLE

AT THE TIME OF 30 % WEAR

AT THE TIME OF 60 % WEAR

AT THE TIME OF NEW ARTICLE

26A(26)  26B1(26)  26B2(26)  26B3(26)

AT THE TIME OF 30 % WEAR

AT THE TIME OF 60 % WEAR

AT THE TIME OF 80 % WEAR

PNEUMATIC TIRE

CROSS-REFERENCE TO RELATED APPLICATIONS

This application is based upon and claims the benefit of priority from the prior Japanese Patent Application No. 2010-154715, filed on Jul. 7, 2010; the entire contents of which are incorporated herein by reference.

BACKGROUND OF THE INVENTION

1. Field of the Invention

The present invention relates to a pneumatic tire, and in particular, it relates to a pneumatic tire in which thin grooves are formed in a land part of a tread surface.

2. Description of the Related Art

In a pneumatic tire in which a land part such as a block and a rib is provided in a tread part, it has hitherto been known to provide the land part with a sipe extending in a tire width direction for the purpose of enhancing drainage properties or the like.

For the purpose of enhancing a water removal effect within a ground contact plane by sipes, JP-A-10-86612 discloses that the thickness of the sipe is alternately varied large and small along a longitudinal direction of the sipe. For the purpose of enhancing the block rigidity without impairing an edge effect by sipes, JP-A-2005-67274 discloses that a raised bottom part by plural tie bars provided at intervals in a sipe length direction is formed in a bottom part of the sipe, thereby varying a height of the raised bottom part. For the purpose of enhancing a wet performance by sipes, JP-A-7-276923 discloses that not only a water draining recess is provided on one lateral face of the sipe, but also a linear water cutting edge is provided on the opposing lateral face thereto.

In a pneumatic tire in which a land part partitioned by main transverse grooves extending in a direction intersecting with a tire circumferential direction is provided in a tread part, when the rigidity of the land part is high, a vibration sound (also called a "block vibration sound") of the land part generated from the main transverse grooves, or uneven wear such as heel-and-toe wear is generated. Though the rigidity of the land part can be reduced by providing a sipe in the land part, it may not always be said that such is sufficient, and it may not be said that the rigidity of the land part can be sufficiently reduced even by the sipe configurations described in the foregoing JP-A-10-86612, JP-A-2005-67274 and JP-A-7-276923.

In order to sufficiently reduce the rigidity of the land part, it is effective to provide a thin groove having a groove width that is narrower than the main transverse grooves but wider than the sipe. However, when the thin groove having a groove width wider than the sipe is provided, a resonance sound from the thin groove is easily generated, and an effect for improving a pattern noise performance becomes insufficient.

SUMMARY OF THE INVENTION

In view of the foregoing circumstances, an object is to provide a pneumatic tire which is excellent in pattern noise performance and resistance to uneven wear.

According to an aspect of the invention, a pneumatic tire includes a tread part having a land part partitioned by main transverse grooves extending in a direction intersecting with a tire circumferential direction provided therein. The land part is provided with a thin groove extending in the direction intersecting with the tire circumferential direction and having a groove width narrower than the main transverse grooves. On one of opposing groove lateral faces of the thin groove, ridges projecting toward the other groove lateral face and extending in a depth direction of the thin groove are provided. Then, a plural number of the ridges are provided in such a manner that they are parallel to each other at intervals in a length direction of the thin groove and that an extending length in the depth direction is set up to include at least two kinds.

In a more preferred embodiment, the plural ridges may be a ridge extending in a vertical direction to the surface of the land part. Also, the plural ridges may be a ridge extending from the open surface of the thin groove in the depth direction and comprised of at least one long ridge extending over the whole of the depth direction and at least one short ridge terminating on the way of the depth direction. The plural ridges may be a ridge in which the extending length differs from each other between the adjacent ridges. In the length direction of the thin groove, a width of each ridge may be set up to be smaller than an interval between the adjacent ridges. The plural ridges may be a ridge having a projecting height exceeding a center line of the groove width from the groove lateral face of one side of the thin groove.

DETAILED DESCRIPTION OF THE PREFERRED EMBODIMENTS

Embodiments of the invention are hereunder described by reference to the accompanying drawings.

First Embodiment

Though illustration is omitted, a pneumatic tire according to First Embodiment is configured to include a left-and-right pair of a bead part and a sidewall part and a tread part provided between the both sidewall parts so as to connect radial-direction external end parts of the left-and-right sidewall parts to each other. The tire includes a carcass extending over the pair of bead parts. The carcass is composed of at least one carcass ply which extends from the tread part to the sidewall parts and both end parts of which are engaged with an annular bead core embedded in the bead parts, and reinforces each of the foregoing parts. A belt composed of two or more rubber-coated steel code layers is provided on the peripheral side of the carcass in the tread part and reinforces the tread part in the periphery of the carcass.

Figure 1:
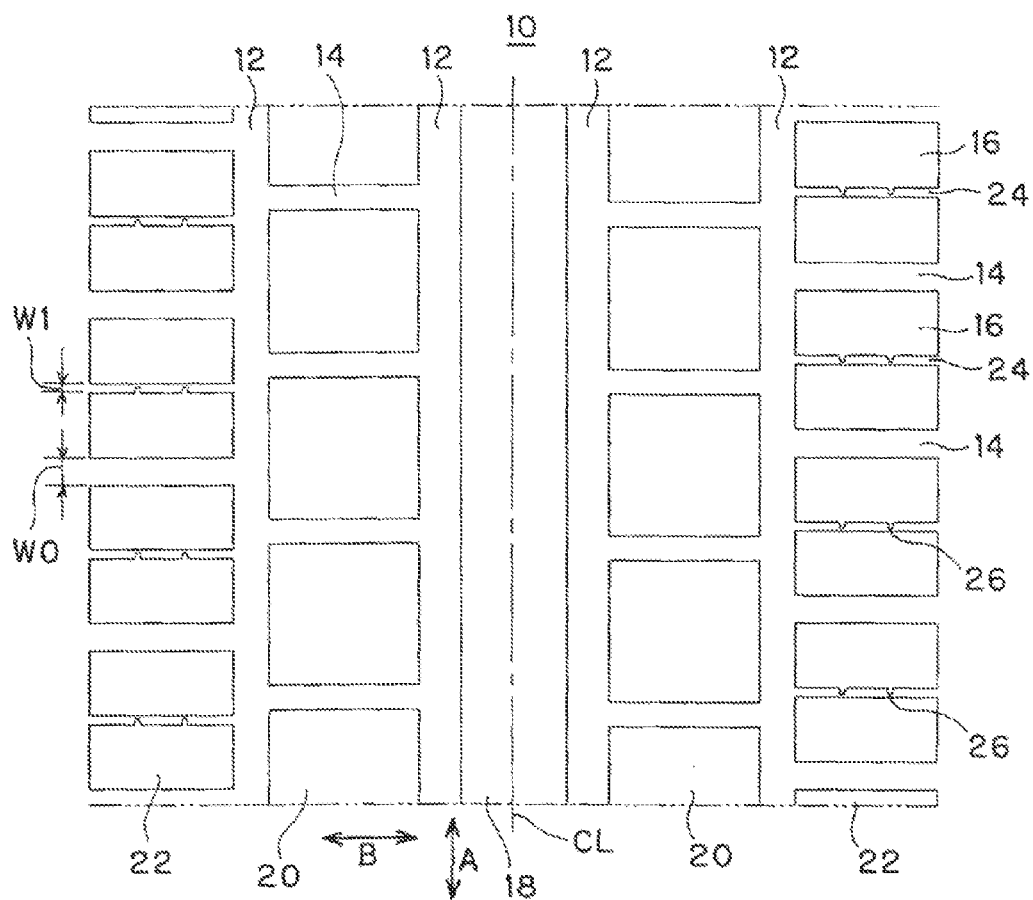
FIG. 1 is a development of a tread pattern of a tire according to First Embodiment.

As shown in FIG. 1, a tread part 10 is provided with plural main longitudinal grooves 12 extending in a straight line in a tire circumferential direction A and plural main transverse grooves 14 extending in a direction intersecting with the tire circumferential direction A. In this exemplary embodiment, four main longitudinal grooves 12 are provided in a tire width direction B. According to this, the tread part 10 is partitioned in the tire width direction B into five regions including a central region 18 on a tire center line CL, intermediate regions 20 and 20 formed on the both sides across the central region 18 and shoulder regions 22 and 22 of both end parts formed more outside the respective intermediate regions 20.

The main transverse grooves 14 are a groove extending in the tire width direction B and is provided intersecting with the main longitudinal groove 12. According to this, the tread part 10 is provided with plural blocks 16 partitioned by the main longitudinal grooves 12 and the main transverse grooves 14. In more detail, in the intermediate region 20 and the shoulder region 22, the main transverse grooves 14 are put side by side at prescribed intervals in the tire circumferential direction A. According to this, the intermediate regions 20 and the shoulder regions 22 are constituted as a block row in which a large number of the blocks 16 are put side by side in the tire circumferential direction A. Meanwhile, a main transverse groove is not provided in the central region 18. For that reason, the central region 18 is formed as a rib continuously extending in the tire circumferential direction A.

In the block 16 that is a land part provided in the shoulder region 18, a thin groove 24 extending in a direction intersecting with the tire circumferential direction A is provided. The thin groove 24 is a groove formed in such a manner that a direction starting from a surface (ground contact surface) 16A of the block 16 and vertical to the surface 16A is defined as a depth direction Z. The thin groove 24 is a transverse groove which is narrower than a groove width W0 of the main transverse groove 14. A thickness of a general sipe is not more than 1.0 mm, whereas the thin groove 24 is a groove, a width of which is larger than that of the sipe. Specifically, a groove width W1 of the thin groove 24 is preferably from 1.2 to 2.5 mm, and more preferably from 1.6 to 2.2 mm.

Figure 2:
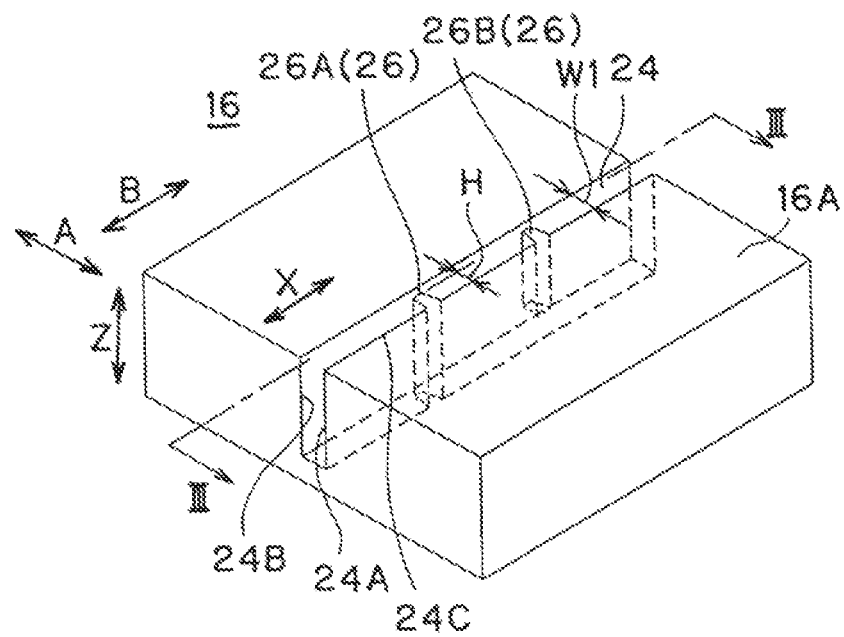
FIG. 2 is a perspective view of a block according to First Embodiment.

In this exemplary embodiment, the thin grooves 24 are provided in parallel to the main transverse grooves 14, and therefore, they extend in a straight line in the tire width direction B. As shown in FIG. 2, in the thin groove 24, the both ends thereof are opened against block edges (both-end open type), namely, the thin groove 24 is provided across the block 16. A depth D1 of the thin groove 24 is set up to be equal to or smaller than a depth D0 of the main transverse groove 14 (see FIG. 3).

On the groove lateral face of the thin groove 24, ridges (i.e. streak-shaped protrusions) 26 extending in its depth direction Z are provided. The ridges 26 are provided on only one groove lateral face 24A of the opposing groove lateral faces of the thin groove 24 and are formed in such a manner that they are projected from the groove lateral face 24A of one side toward the groove lateral face 24B of the other side and that they do not reach the groove lateral face 24B of the other side.

Figure 3:
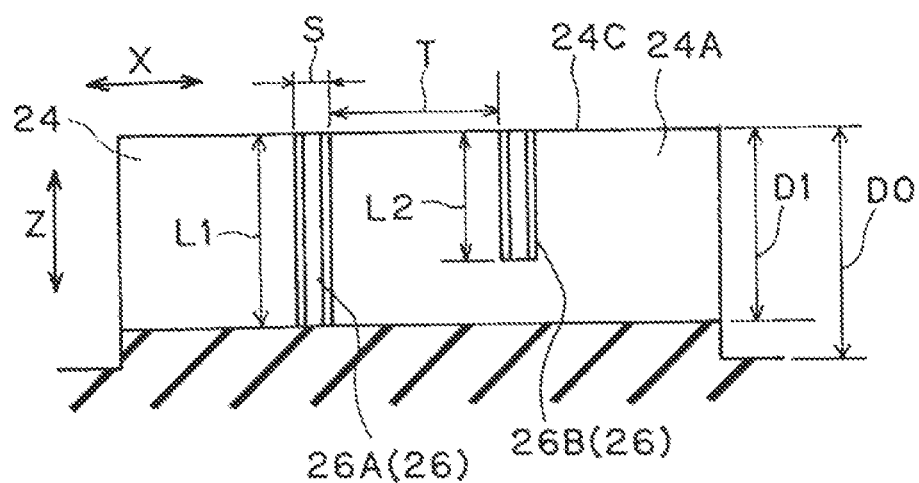
FIG. 3 is a III-III line sectional view of FIG. 2.

In this exemplary embodiment, two ridges 26 are provided in parallel to each other at an interval in a length direction X of the thin groove 24. The ridge 26 extends in a straight line in a vertical direction to the surface 16A of the block 16. As shown in FIG. 3, the two ridges 26 are provided while varying an extending length in the depth direction Z from each other.

In detail, the ridges 26 are provided extending from an open surface (namely, a surface which is opened against the block surface 16A) 24C toward the depth direction Z and composed of a long ridge 26A extending over the whole of the depth direction Z and a short ridge 26B extending from the open surface 24C and terminating on the way of the depth direction Z. An extending length L1 of the long ridge 26A is set up to be equal to the depth D1 of the thin groove 24, and an extending length L2 of the short ridge 26B can be set up to be, for example, from 50 to 80% of the depth D1 of the thin groove 24.

A width S (width in the length direction X of the thin groove 24) of the two ridges 26A and 26B is set up to be equal to each other, and the width S is set up to be sufficiently smaller than an interval T between the adjacent ridges 26A and 26B. Incidentally, in this exemplary embodiment, the ridge 26 is formed so as to have a trapezoidal sectional shape and is provided in two places of dividing the length of the thin groove 24 into three equal parts in the length direction X of the thin groove 24.

Figure 4A:
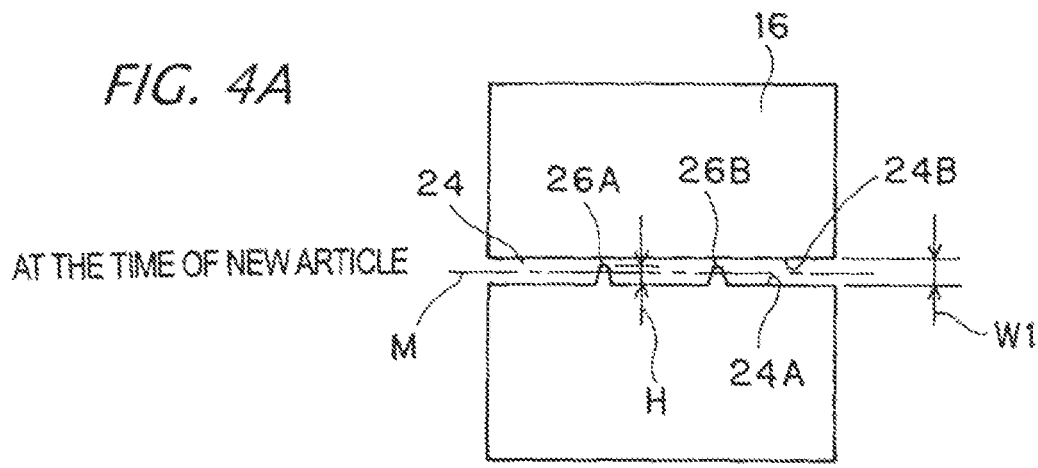
FIGS. 4A and 4B are each a plan view of a block according to First Embodiment in each of wear stages.

As shown in FIG. 4A, the ridge 26 is formed so as to have a projecting height H exceeding a center line M of the groove width from the groove lateral face 24A of one side of the thin groove 24 and projecting to a neighborhood of the groove lateral face 24B of the other side. That is, the projecting height H of the ridge 26 is set up to be more than 50% of the groove width W1 of the thin groove 24, and the projecting height H of the ridge 26 is preferably set up to be in the range of from 60 to 80% of the groove width W1.

According to the thus configured present embodiment, by providing the thin grooves 24 having a wider width than the sipes in the blocks 16 partitioned by the main transverse grooves 14, the rigidity of the blocks 16 can be more reduced. For that reason, the effect for reducing a block vibration sound generated from the main transverse grooves 14 or heel-and-toe wear can be enhanced. Meanwhile, in the case of providing the thin grooves 24 having a wider width than the sipes, a resonance sound from the thin grooves 24 is easily generated. For that reason, assuming that the thin grooves 24 are merely provided, the improving effect is insufficient as a pattern noise performance combining the block vibration sound and the resonance sound. However, according to the present embodiment, as described previously, by providing the two ridges 26A and 26B having the different extending lengths L1 and L2, respectively in the depth direction Z, the flow of air within the thin groove 24 is disturbed, so that the resonance sound can be reduced. For that reason, an enhancement margin of the pattern noise performance becomes large. Accordingly, the pattern noise performance and the resistance to uneven wear can be enhanced.

Also, according to the present embodiment, as described previously, the ridge 26 is constituted of the long ridge 26A extending over the whole of the depth direction Z of the thin groove 24 and the short ridge 26B terminating on the way of the depth direction Z, and the projecting height H of the ridge 26 is set up to be large, so that an action to disturb the flow of air within the thin groove 24 can be enhanced. Also, by setting up the width S of the ridge 26 to be smaller than the interval T between the ridges 26, it is possible to exhibit the action to disturb the flow of air without impairing the effect for reducing the block rigidity by the thin grooves 24 to the utmost.

Figure 4B:
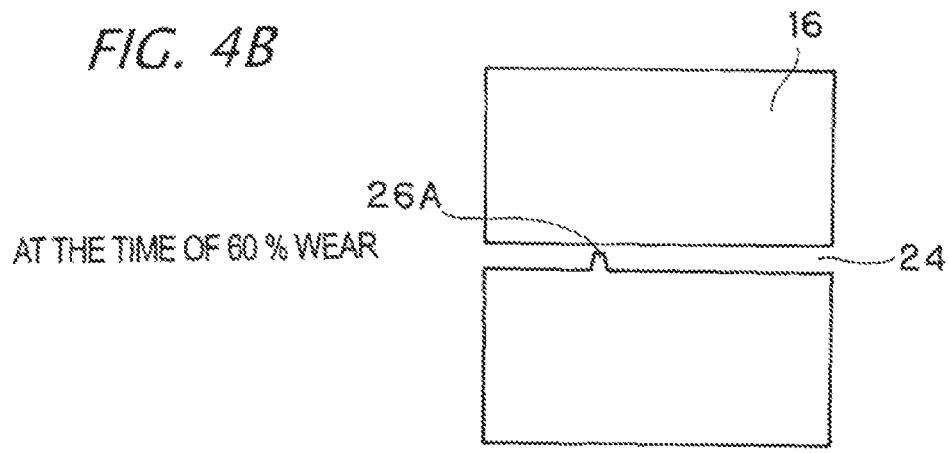

Also, according to the present embodiment, as for the opening shape of the thin groove 24, as shown in FIG. 4A, at the beginning of wear including the time of a new article, the two ridges 26A and 26B are present. However, as shown in FIG. 4B, for example, at the time of 60% wear, only the one ridge 26A is present. In this way, in view of the fact that the extending lengths L1 and L2 of the two ridges 26A and 26B are different, the number of the ridge 26 changes with the progress of wear. Therefore, the ridges 26 can also be utilized as a wear indicator for checking the degree of progress of wear.

Second Embodiment

Figure 5:
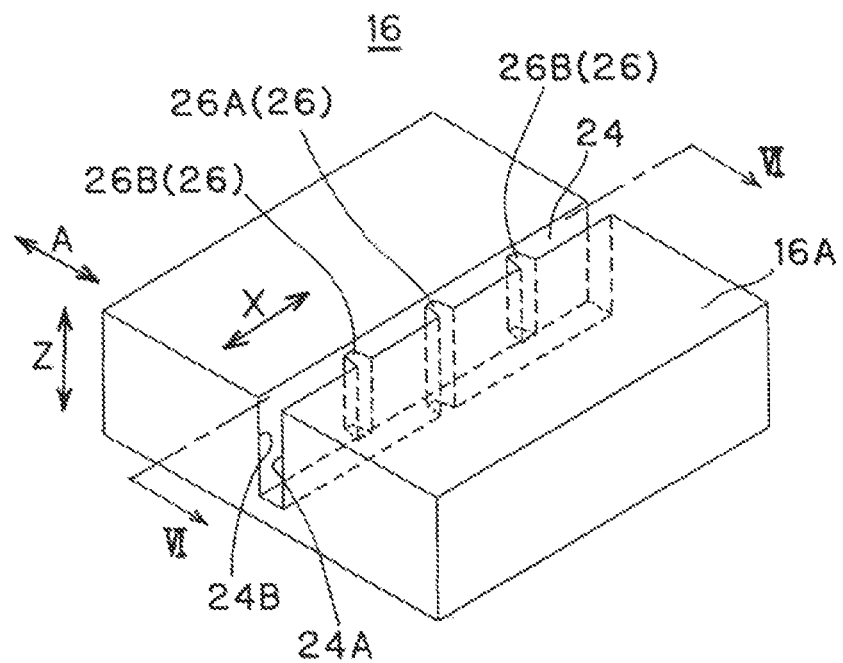
FIG. 5 is a perspective view of a block according to Second Embodiment.
Figure 6:
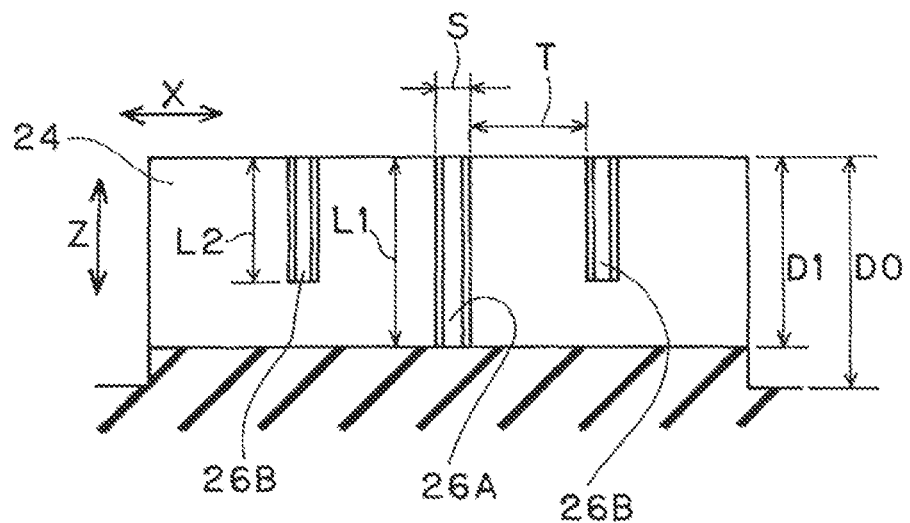
FIG. 6 is a VI-VI line sectional view of FIG. 5.

Each of FIGS. 5 and 6 shows a block according to Second Embodiment. This exemplary embodiment is different from First Embodiment on the point that three ridges 26 are provided. The three ridges 26 are provided in parallel to each other at intervals in the length direction X of the thin groove 24, and an extending length of these three ridges 26 in the depth direction Z is set up to include two kinds.

In more detail, the ridges 26 are composed of one long ridge 26A extending over the whole of the depth direction Z of the thin groove 24 and two short ridges 26B and 26B terminating on the way of the depth direction Z. These three ridges 26 are provided at equal intervals in the length direction X of the thin groove 24, and the long ridge 26A is arranged in the center, whereas each of the short ridges 26B and 26B is arranged on each side of the long ridge 26A. According to this, the ridges 26 are disposed in such a manner that the extending lengths L1 and L2 are different from each other between the adjacent ridges 26A and 26B.

Other configurations are the same as those in First Embodiment, and the same actions and effects are brought. However, according to the present embodiment, by increasing the number of the ridge 26, an action to disturb the flow of air within the thin groove 24 can be enhanced, and the pattern noise performance can be more enhanced.

Third Embodiment

Figure 7:
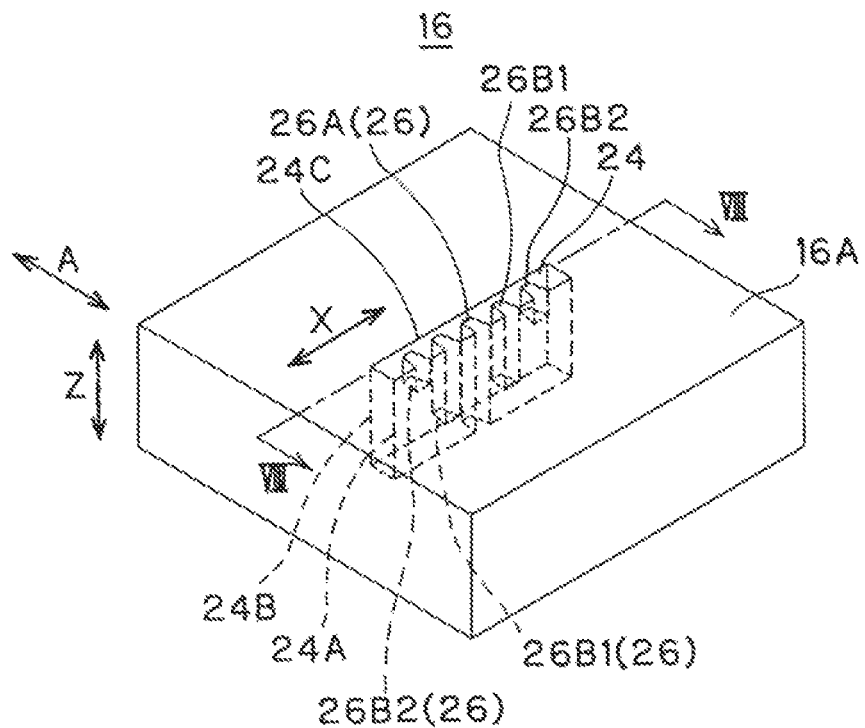
FIG. 7 is a perspective view of a block according to Third Embodiment.
Figure 8:
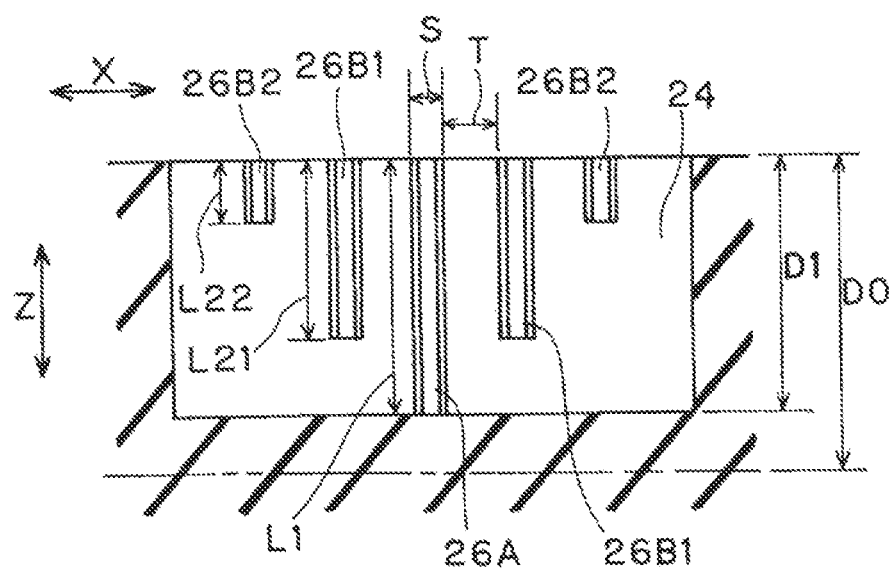
FIG. 8 is a VIII-VIII line sectional view of FIG. 7.

Each of FIGS. 7 and 8 shows a block according to Third Embodiment. This exemplary embodiment is different from the foregoing embodiments on the point that the both ends of the thin groove 24 are not opened against the block edges, namely, the thin groove 24 is a groove terminating within the block 16 (both-end closed type).

Also, this exemplary embodiment is different from First Embodiment on the point that five ridges 26 are provided. The five ridges 26 are provided in parallel to each other at intervals in the length direction X, and an extending length of these five ridges 26 in the depth direction Z is set up to include three kinds.

In more detail, the ridges 26 are composed of one long ridge 26A extending over the whole of the depth direction Z of the thin groove 24 and four short ridges 26B1, 26B1, 26B2 and 26B2 terminating on the way of the depth direction Z. These five ridges 26 are provided at an equal interval in the length direction X of the thin groove 24, and the long ridge 26A is arranged in the center, whereas one each of the first short ridges 26B1 and 26B1 having an extending length L21 is arranged on each side of the long ridge 26A, and one each of the second short ridges 26B2 and 26B2 having an extending length L22 that is shorter than L21 is arranged on the outside of each of the first short ridges 26B1 and 26B1. According to this, the ridges 26 are disposed in such a manner that the extending lengths L1, L21 and L22 are different from each other between the adjacent ridges.

The extending length L21 of the first short ridge 26B1 can be, for example, set up to be from 50 to 80% of the depth D1 of the thin groove 24, and the extending length L22 of the second short ridge 26B2 can be, for example, set up to be from 20 to 40% of the depth D1 of the thin groove 24.

Other configurations are the same as those in First Embodiment, and basically, the same actions and effects are brought. As compared with the case of providing sipes, even in the case where the thin groove 24 terminates within the block 16 in this way, the effect for reducing the block vibration sound and uneven wear can be enhanced by reducing the block rigidity. Further, the flow of air within the thin groove 24 is disturbed by providing the plural ridges 26, so that the resonance sound can be reduced. In particular, according to the present embodiment, by increasing the number of the ridges 26, an action to disturb the flow of air within the thin groove 24 can be enhanced, and the pattern noise performance can be more enhanced.

Figure 9A:
FIGS. 9A to 9C are each a plan view of a thin groove according to Third Embodiment in each of wear stages.
Figure 9B:
Figure 9C:
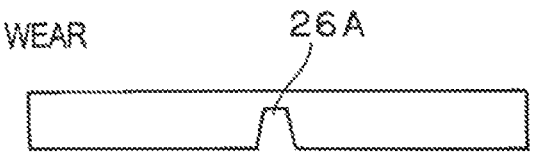

Also, according to the present embodiment, as for the opening shape of the thin groove 24, as shown in FIG. 9A, at the beginning of wear including the time of a new article, the five ridges 26 are present; as shown in FIG. 9B, at the time of 30% wear, the three ridges 26A, 26B1 and 26B1 are present; and as shown in FIG. 9C, at the time of 60% wear, the one ridge 26A is present. Therefore, discrimination as a wear indicator is more enhanced.

Fourth Embodiment

Figure 10:
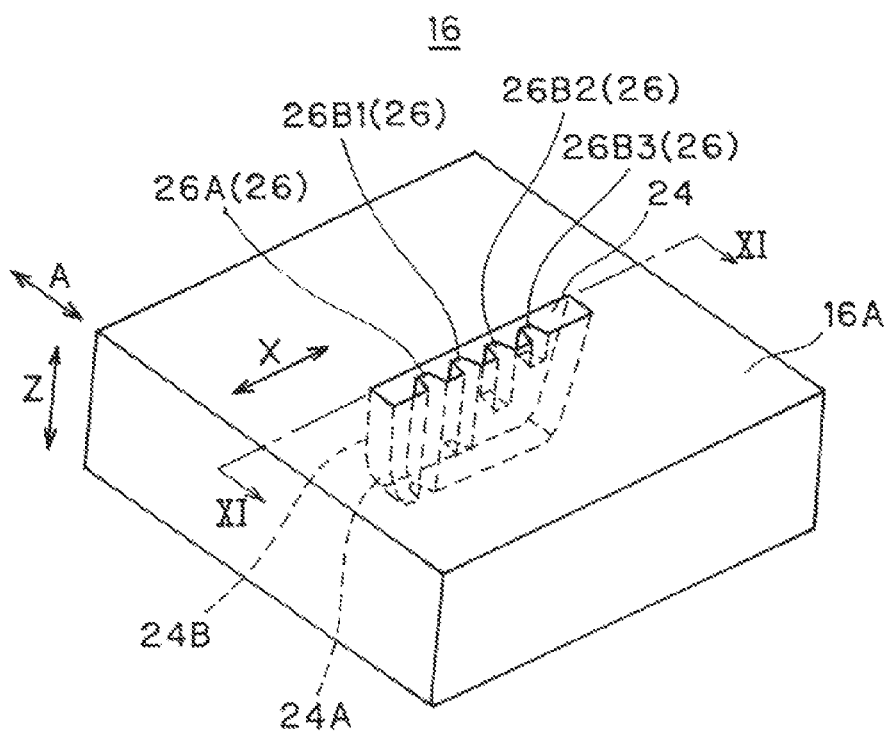
FIG. 10 is a perspective view of a block according to Fourth Embodiment.
Figure 11:
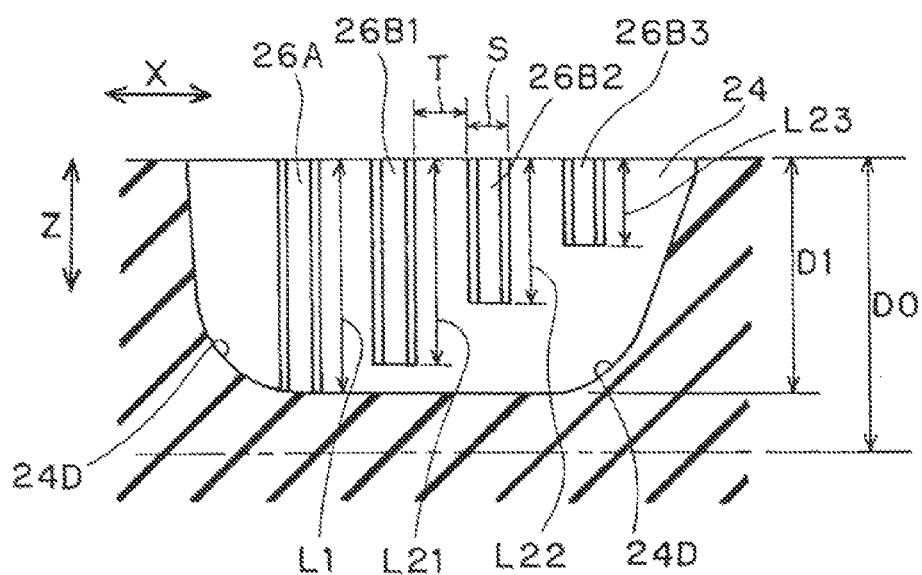
FIG. 11 is a XI-XI line sectional view of FIG. 10.

Each of FIGS. 10 and 11 shows a block according to Fourth Embodiment. This exemplary embodiment is different from Third Embodiment on the point that four ridges 26 are provided. The four ridges 26 are provided in parallel to each other at intervals in the length direction X, and an extending length of these four ridges 26 in the depth direction Z is set up to include four kinds such that the extending length is different in all of the four ridges 26.

In more detail, the ridges 26 are composed of one long ridge 26A extending over the whole of the depth direction Z of the thin groove 24 and three short ridges 26B1, 26B2 and 26B3 terminating on the way of the depth direction Z. These four ridges 26 are provided at an equal interval in the length direction X of the thin groove 24; the long ridge 26A is arranged near the end part; the first short ridge 26B1 having an extending length L21 is arranged adjacent to the long ridge 26A; the second short ridge 26B2 having an extending length L22 that is shorter than L21 is arranged adjacent to the first short ridge 26B1; and the third short ridge 26B3 having an extending length L23 that is shorter than L22 is arranged adjacent to the second short ridge 26B2. Accordingly, the ridges 26 are disposed in such a manner that the extending length becomes short successively along the length direction X of the thin groove 24.

As for the extending lengths of the respective short ridges 26B1, 26B2 and 26B3, the extending length L21 of the first short ridge 26B1, the extending length L22 of the second short ridge 26B2 and the extending length L23 of the third short ridge 26B3 can be, for example, set to be from 75 to 90%, from 50 to 70% and from 20 to 40%, respectively relative to the depth D1 of the thin groove 24.

As shown in FIG. 11, according to this exemplary embodiment, a groove bottom part 24D in each end part in the length direction X of the thin groove 24 is formed in a curved shape for the purpose of contriving to disperse a stress.

Figure 13:
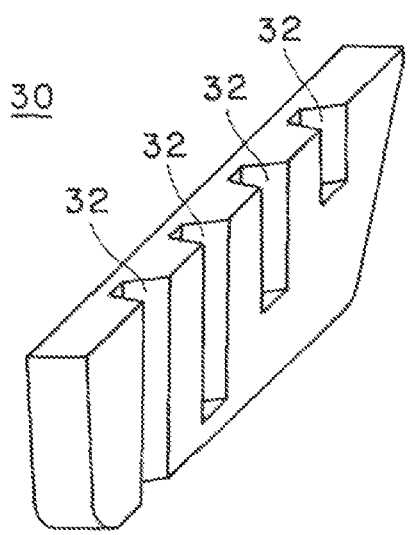
FIG. 13 is a perspective view of a blade for molding a thin groove according to Fourth Embodiment.

FIG. 13 is a perspective view of a blade 30 for molding the thin groove 24. Recess grooves 32 for molding the ridges 26 are provided on only one surface of the blade 30. For the purpose of forming the plural ridges 26 having a different extending length as described previously, the plural recess grooves 32 having a different length from each other are put side by side and provided in a length direction of the blade 30.

When the blade 30 is implanted on the surface of a tread molding part of a non-illustrated tire molding die, the thin groove 24 can be formed on the surface of the tread part 10 at the time of vulcanization molding of a pneumatic tire. Molding of the thin groove by such a blade is also the same in the foregoing First Embodiment to Third Embodiment.

Figure 12A:
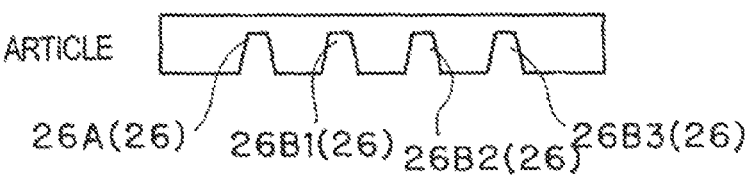
FIGS. 12A to 12D are each a plan view of a thin groove according to Fourth Embodiment in each of wear stages.
Figure 12B:
Figure 12C:
Figure 12D:
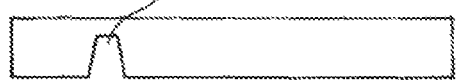

Other configurations are the same as those in Third Embodiment, and the same actions and effects are brought. Also, according to the present embodiment, as for the opening shape of the thin groove 24, as shown in FIG. 12A, at the beginning of wear including the time of a new article, the four ridges 26 are present; as shown in FIG. 12B, at the time of 30% wear, the three ridges 26A, 26B1 and 26B2 are present; as shown in FIG. 12C, at the time of 60% wear, two ridges 26A and 26B1 are present; and as shown in FIG. 12D, at the time of 80% wear, the one ridge 26A is present. In this way, the wear stage can be expressed by four stages, and therefore, the degree of progress of wear can be checked more minutely.

Other Embodiments

For the purpose of effectively achieving the original function of the thin groove 24 to reduce the block rigidity, the number of the ridge 26 to be provided in the thin groove 24 is preferably from two to five. Also, for the purpose of effectively achieving the action to disturb the flow of air within the thin groove 24, it is more preferable that three or more ridges 26 are provided.

In the foregoing embodiments, as for the thin groove 24, an example in which the both ends thereof are opened against the block edges and an example in which the both ends thereof terminate within the block have been described. However, the thin groove may be a thin groove in which one end thereof is opened against the block edge, and the other end terminates within the block.

In the foregoing embodiments, though the thin groove 24 is provided in all of the blocks 16 existing in the shoulder region 22, it is not always necessary to provide the thin groove 24 in all of the blocks 16. Also, the region of blocks in which the thin groove 24 is provided is not limited to the shoulder region 22, but the thin groove 24 may be provided in blocks in other region such as the intermediate region 20 and the central region 18. Also, the number of the thin groove 24 is not limited to one in each block 16, but two or more thin grooves may be provided in each block 16. Also, the block 16 may be provided with a usual sipe extending in the tire width direction together with the thin groove 24.

In the foregoing embodiments, the main transverse groove 14 and the thin groove 24 are formed in parallel to the tire width direction B. However, these main transverse groove 14 and thin groove 24 may be provided inclined against the tire width direction B. Also, the main transverse groove 14 and the thin groove 24 are not limited to a groove extending in a straight line but may be, for example, a groove extending in a curved form.

In the foregoing embodiments, the main transverse groove 14 is provided in a shape that the both ends thereof are opened against the main longitudinal groove 12 or the tread end such that it completely traverses the block 16. However, the main transverse groove 14 may be a groove in which only one end thereof is opened, and the other end terminates within the land part of each of the regions 18, 20 and 22. In that case, in the subject region, the land part is continuous in the tire circumferential direction A, and a land part that is in a rib shape but not in a block shape is formed. The land part partitioned by the main transverse groove to which the invention is subjective may be such a continuous land part that is partitioned in the tire circumferential direction A by the non-penetrated main transverse groove 14 but is not limited to the block. While others are not enumerated one by one, various modifications can be made so far as the gist of the invention is not deviated.

EXAMPLES

Pneumatic radial tires (196/65R15) of Examples 1 and 2 and Comparative Examples 1 and 2 each having a configuration of a thin groove shown in the following Table 1 were made on an experimental basis.

The tire of Example 1 is a tire having the tread pattern according to the foregoing First Embodiment and was set up to have a depth D0 of each of the main longitudinal groove 12 and the main transverse groove 14 of 8.7 mm, a groove width W0 of the main transverse groove 14 of 5 mm, a depth D1 of the thin groove 24 of 7.1 mm and a length of the thin groove 24 of 27 mm. Also, each of the ridges 26 was set up to have a projecting height H of 1.4 mm and a width S of 1.2 mm. The tire of Example 2 is a tire having the tread pattern according to the foregoing Second Embodiment, and it was fabricated in the same manner as in Example 1, except for adopting the configuration of the thin groove shown in Table 1. The tire of Comparative Example 1 is concerned with an example in which a general sipe was formed in place of the thin groove, and the ridge was not provided, and besides, it was fabricated in the same manner as in Example 1. The tire of Comparative Example 2 is concerned with an example in which the ridge is omitted relative to Example 1, and besides, it was fabricated in the same manner as in Example 1.

Four wheels of tires having a rim size of 15×6 were installed in a 1,500-cc class automobile (FF-sedan) (air pressure: 210 kPa), and not only a block vibration sound and a resonance sound as the pattern noise performance were evaluated, but heel-and-toe wear was evaluated. The evaluation methods are as follows.

Pattern Noise Performance:

Each of a block vibration sound with a frequency characteristic relying upon a vehicle speed and a resonance sound with a fixed high-frequency not relying upon a vehicle speed was graded by means of organoleptic evaluation in a real car and expressed in terms of an index while defining a value of the tire of Comparative Example 1 as 100. It is meant that the larger the index, the smaller the noise and the more excellent the performance.

Heel-and-Toe Wear Amount:

A heel-and-toe wear amount in the main transverse groove in the shoulder region at the time of 50% wear was measured. The "heel-and-toe wear amount" as referred to herein is a difference between a tread-in side wear amount and a kick-out side wear amount between the adjacent blocks. An average value of the heel-and-toe wear amount in all of the main transverse grooves was determined. It is meant that the smaller this value, the smaller the heel-and-toe wear amount and the more excellent the resistance to uneven wear.

The results are shown in the following Table 1. As compared with Comparative Example 1 in which a general sipe was provided, in Comparative Example 2 in which the thin groove that is wider than the sipe was provided, the heel-and-toe wear was reduced, and the block vibration sound was reduced; however, the resonance sound was generated, and therefore, the enhancing effect as the total pattern noise performance was insufficient. On the other hand, Example 1 in which the ridges were added in the thin groove was improved in the resonance sound while keeping the effects for improving the heel-and-toe wear and the block vibration sound as compared with Comparative Example 2 and remarkably improved as the total pattern noise performance as compared with Comparative Examples 1 and 2. In Example 2 in which three ridges were provided, the effect for improving the resonance sound was larger than that of Example 1, and therefore, the pattern noise performance was more excellent.

TABLE 1

|  |  | Comparative Example 1 | Comparative Example 2 | Example 1 | Example 2 |
|---|---|---|---|---|---|
| Configuration of thin groove | Form of thin groove | Both-end open type | Both-end open type | Both-end open type | Both-end open type |
|  | Width W1 of thin groove (mm) | 0.6 | 2.0 | 2.0 | 2.0 |
|  | Number of ridge | No | No | Two | Three |
|  | Configuration of ridge | — | — | FIG. 2<br>L1 = 7.1 mm<br>L2 = 5.2 mm | FIG. 5<br>L1 = 7.1 mm<br>L2 = 5.2 mm |
| Pattern noise performance | Block vibration sound | 100 | 109 | 108 | 108 |
|  | Resonance sound | 100 | 94 | 98 | 100 |
| Heel-and-toe wear amount (mm) |  | 1.5 | 0.8 | 0.8 | 0.8 |

Pneumatic radial tires (195/65R15) of Example 3 and Comparative Example 3 each having a configuration of a thin groove shown in the following Table 2 were made on an experimental basis. The tire of Example 3 is a tire having the tread pattern according to the foregoing Third Embodiment and was set up to have a depth D0 of each of the main longitudinal groove 12 and the main transverse groove 14 of 8.7 mm, a groove width W0 of the main transverse groove 14 of 5 mm, a depth D1 of the thin groove 24 of 7.1 mm and a length of the thin groove 24 of 15 mm. Also, each of the ridges 26 was set up to have a projecting height H of 1.4 mm and a width S of 1.2 mm. The tire of Comparative Example 3 is concerned with an example in which the ridge is omitted relative to Example 3, and besides, it was fabricated in the same manner as in Example 3. The resulting tires were evaluated with respect to the pattern noise performance and the heel-and-toe wear in the same manners as in the foregoing Example 1. The pattern noise performance of Example 3 was expressed in terms of an index while defining a value of the tire of Comparative Example 3 as 100.

The results are shown in the following Table 2. Example 3 in which the ridges were added in the thin groove was improved in the resonance sound while keeping the effects for improving the heel-and-toe wear and the block vibration sound as compared with Comparative Example 3 and remarkably improved as the total pattern noise performance as compared with Comparative Example 3.

TABLE 2

|  |  | Comparative Example 3 | Example 3 |
|---|---|---|---|
| Configuration of thin groove | Form of thin groove | Both-end closed type | Both-end closed type |
|  | Width W1 of thin groove (mm) | 2.0 | 2.0 |
|  | Number of ridge | No | 5 |
|  | Configuration of ridge | — | FIG. 7<br>L1 = 7.1 mm<br>L21 = 5.2 mm<br>L22 = 2.6 mm |
| Pattern noise performance | Block vibration sound | 100 | 100 |
|  | Resonance sound | 100 | 103 |
| Heel-and-toe wear amount (mm) |  | 1.2 | 1.2 |

As stated above, according to the pneumatic tire of the embodiments, by providing the thin groove in the land part, the vibration sound of the land part generated from the main transverse grooves or heel-and-toe wear can be reduced. Also, with respect to the resonance sound to be generated by providing the thin groove, when the plural ridges having a different length from each other in the depth direction are provided, a flow of air within the thin groove is disturbed, so that the resonance sound can be reduced. For that reason, the pattern noise performance can be enhanced.

What is claimed is:

1. A pneumatic tire comprising a tread part having a land part partitioned by main transverse grooves extending in a direction intersecting with a tire circumferential direction, wherein
    the land part is provided with a thin groove extending in the direction intersecting with the tire circumferential direction and having a groove width narrower than the main transverse grooves; on one of opposing groove lateral faces of the thin groove, ridges projecting toward the other groove lateral face and extending in a depth direction of the thin groove are provided; and a plural number of the ridges are provided in such a manner that they are parallel to each other at intervals in a length direction of the thin groove and that an extending length in the depth direction is set up to include at least two kinds, and
    wherein the number of the ridges is from two to five.

2. The pneumatic tire according to claim 1, wherein the plural ridges extend in a vertical direction to the surface of the land part.

3. The pneumatic tire according to claim 1, wherein the plural ridges extend from the open surface of the thin groove in the depth direction and are comprised of at least one long ridge extending over the whole of the depth direction and at least one short ridge terminating on the way of the depth direction.

4. The pneumatic tire according to claim 1, wherein the plural ridges are different from each other in the extending length between the adjacent ridges.

5. The pneumatic tire according to claim 1, wherein in the length direction of the thin groove, a width of each ridge is set up to be smaller than an interval between the adjacent ridges.

6. The pneumatic tire according to claim 1, wherein the plural ridges have a projecting height exceeding a center line of the groove width from the groove lateral face of one side of the thin groove.

7. The pneumatic tire according to claim 1, wherein a groove width of the thin groove is from 1.2 to 2.5 mm.

8. The pneumatic tire according to claim 1, wherein the thin groove is a both-end open type groove whose both ends are opened against edges of the land part.

9. The pneumatic tire according to claim 1, wherein the plural ridges are disposed in such a manner that the extending length becomes short successively along the length direction of the thin groove.

10. The pneumatic tire according to claim 9, wherein the plural ridges extend from the open surface of the thin groove in the depth direction and are comprised of one long ridge extending over the whole of the depth direction, one first short ridge terminating on the way of the depth direction and arranged adjacent to the long ridge, one second short ridge having an extending length that is shorter than the first short ridge and arranged adjacent to the first short ridge, and one third short ridge having an extending length that is shorter than the second short ridge and arranged adjacent to the second short ridge.

11. A pneumatic tire comprising a tread part having a land part partitioned by main transverse grooves extending in a direction intersecting with a tire circumferential direction, wherein
- the land part is provided with a thin groove extending in the direction intersecting with the tire circumferential direction and having a groove width narrower than the main transverse grooves; on one of opposing groove lateral faces of the thin groove, ridges projecting toward the other groove lateral face and extending in a depth direction of the thin groove are provided; and a plural number of the ridges are provided in such a manner that they are parallel to each other at intervals in a length direction of the thin groove and that an extending length in the depth direction is set up to include at least two kinds, and
- wherein the thin groove is a both-end closed type groove whose both ends terminate within the land part.

12. The pneumatic tire according to claim 11, wherein a groove bottom part in each end part in the length direction of the thin groove is formed in curved shape.

13. A pneumatic tire comprising a tread part having a land part partitioned by main transverse grooves extending in a direction intersecting with a tire circumferential direction, wherein
- the land part is provided with a thin groove extending in the direction intersecting with the tire circumferential direction and having a groove width narrower than the main transverse grooves; on one of opposing groove lateral faces of the thin groove, ridges projecting toward the other groove lateral face and extending in a depth direction of the thin groove are provided; and a plural number of the ridges are provided in such a manner that they are parallel to each other at intervals in a length direction of the thin groove and that an extending length in the depth direction is set up to include at least two kinds, and
- wherein the plural ridges extend from the open surface of the thin groove in the depth direction and are comprised of one long ridge extending over the whole of the depth direction and two short ridges terminating on the way of the depth direction and arranged on each side of the long ridge.

14. A pneumatic tire comprising a tread part having a land part partitioned by main transverse grooves extending in a direction intersecting with a tire circumferential direction, wherein
- the land part is provided with a thin groove extending in the direction intersecting with the tire circumferential direction and having a groove width narrower than the main transverse grooves; on one of opposing groove lateral faces of the thin groove, ridges projecting toward the other groove lateral face and extending in a depth direction of the thin groove are provided; and a plural number of the ridges are provided in such a manner that they are parallel to each other at intervals in a length direction of the thin groove and that an extending length in the depth direction is set up to include at least two kinds, and
- wherein the plural ridges extend from the open surface of the thin groove in the depth direction and are comprised of one long ridge extending over the whole of the depth direction, two first short ridges terminating on the way of the depth direction and arranged on each side of the long ridge, and two second short ridges having an extending length that is shorter than the first short ridge and arranged on the outside of each of the first short ridges.

* * * * *